United States Patent
Asami et al.

(10) Patent No.: US 6,714,223 B2
(45) Date of Patent: Mar. 30, 2004

(54) INTERACTIVE-TYPE USER INTERFACE DEVICE HAVING ROOT SCENARIO

(75) Inventors: Katsushi Asami, Souraku-gun (JP); Mikio Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 488 days.

(21) Appl. No.: 09/788,553

(22) Filed: Feb. 21, 2001

(65) Prior Publication Data

US 2001/0032274 A1 Oct. 18, 2001

(30) Foreign Application Priority Data

Apr. 14, 2000 (JP) .................................. 2000-113552

(51) Int. Cl.⁷ .................................................. G06F 3/00
(52) U.S. Cl. ..................... 345/854; 345/767; 345/853; 709/318
(58) Field of Search ................... 345/854, 853, 345/778, 767, 727, 779, 841, 804, 771, 769; 715/501.1; 709/318, 329, 312; 701/200, 208, 211, 36, 48

(56) References Cited

U.S. PATENT DOCUMENTS

| | | | | |
|---|---|---|---|---|
| 5,050,105 A | * | 9/1991 | Peters | 345/854 |
| 5,297,253 A | * | 3/1994 | Meisel | 345/854 |
| 6,225,920 B1 | * | 5/2001 | Dayle | 345/841 X |
| 6,417,874 B2 | * | 7/2002 | Bodnar | 345/854 |
| 6,489,975 B1 | * | 12/2002 | Patil et al. | 345/779 X |

FOREIGN PATENT DOCUMENTS

| | | |
|---|---|---|
| JP | A-7-140998 | 6/1995 |
| JP | A-10-111698 | 4/1998 |
| JP | A-11-224179 | 8/1999 |
| JP | A-11-232657 | 8/1999 |

OTHER PUBLICATIONS

Microsoft Windows Graphical Environment User's Guide (Version 3.0), Microsoft Corporation, 1985–1990, pp. 77–82, 88–93, 103, 223, 264.*
U.S. patent application Ser. No. 09/328,339, Sasaki, filed Jun. 9, 1999.
U.S. patent application Ser. No. 09/490,442, Sasaki et al., filed Jan. 24, 2000.
U.S. patent application Ser. No. 09/633,144, Sasaki et al., filed Aug. 4, 2000.

* cited by examiner

*Primary Examiner*—Raymond J. Bayerl
(74) *Attorney, Agent, or Firm*—Posz & Bethards, PLC (57) ABSTRACT

An interactive-type user interface device for a navigation system or the like in a car enables switching of application programs (APs) in the course of a single interaction with simple scenario descriptions for realizing interactive processing. A scenario for realizing interactive processing by a controller includes a root scenario and a plurality of AP scenario groups, each corresponding to a different AP. In each AP scenario group, only information for acquiring information needed by the respective AP is described. Processing for starting the APs and processing for loading the respective AP scenario groups are described together in the root scenario. Each AP scenario group includes an AP root scenario and multiple AP scenarios. Dialogue information relating to a predetermined topic for realizing interactive processing is described in each AP scenario, while information for branching to the AP scenarios is described in the AP root scenario.

23 Claims, 7 Drawing Sheets

| INFORMATION | CLASSIFYING ATTRIBUTE | SUB-CLASSIFYING ATTRIBUTE |
|---|---|---|
| ⋮ | ⋮ | ⋮ |
| SEARCH | 027 | 01 |
| FIND | 027 | 02 |
| LOOK-FOR | 027 | 03 |
| ⋮ | ⋮ | ⋮ |
| SWITCH ON | 029 | 01 |
| LISTEN | 029 | 02 |
| PLAY/MAKE | 029 | 03 |
| ⋮ | ⋮ | ⋮ |
| KARIYA CITY | 101 | 01 |
| NAGOYA CITY | 101 | 02 |
| ⋮ | ⋮ | ⋮ |

INTERACTIVE-TYPE USER INTERFACE DEVICE HAVING ROOT SCENARIO

BACKGROUND OF THE INVENTION

1. Field of the Invention

This invention relates to an interactive-type user interface device for realizing a natural interaction with a user and acquiring information needed by an application program on the basis of this interaction.

2. Related Art

An interactive-type user interface device is proposed in Japanese Patent Application No. 11-232657 filed Aug. 19, 1999 and assigned to the same assignee as this patent application.

In this interactive-type user interface device, interactive processing is carried out on the basis of a scenario prepared in association with an application program (AP) such as a program for providing travel route guidance in a vehicle. That is, the interactive (dialogue or the like) processing is executed on the basis of a scenario. The description of the interactive processing itself is made independent of the AP and the flow of the interaction is made free from the influence of the processing procedure of the AP, and a natural dialogue, i.e. a dialogue in which there is a high degree of freedom on the user side, is realized.

Also, scenarios are prepared in one-to-one correspondence with a plurality of APs. When a piece of information relating to another AP is inputted in interactive processing based on a certain scenario, the scenario corresponding to that of the another AP is loaded and interactive processing based on that scenario is executed. In this way, it is made possible for a plurality of APs to be executed selectively in the course of a single interactive processing.

However, in this interactive-type user interface device, when the number of APs becomes large, the scenario descriptions for switching among them become very lengthy.

SUMMARY OF THE INVENTION

It is therefore an object of the present invention to provide an interactive-type user interface device which is capable of switching from one AP to another Ap in the course of a single interaction processing while requiring only, simple scenario descriptions for the interactive processing.

According to the present invention, an interactive-type user interface device for use with respect to a plurality of applications comprises a controller which acquires information needed by the applications through an interaction with a user and sends the information to the applications, by executing interactive processing based on application scenario groups provided in one-to-one association with the applications. A root scenario is provided separately from the application scenario groups for realizing application branch processing which selects and starts an application corresponding to inputted information from the user and loads the application scenario group associated with that application. The controller is capable of executing interactive processing based on another of the application scenario groups part-way through the interactive processing based on one of the application scenario groups, by executing application branch processing based on the root scenario.

Preferably, each of the application scenario groups describes therein at least dialogue information made up of request information for making an input request requesting information needed by the respective application, expected input information expected to be inputted by the user in response to the input request, and branch information corresponding to the expected input information. The controller carries out, as the interactive processing, input request processing based on the request information, comparison processing which compares inputted information from the user with the expected input information, and branch processing based on results of this comparison.

Preferably, the device further has a common data memory which stores the inputted information. The controller stores the inputted information in the common data memory and is capable of acquiring the inputted information by referring to the common data memory in interactive processing based on another application scenario group.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
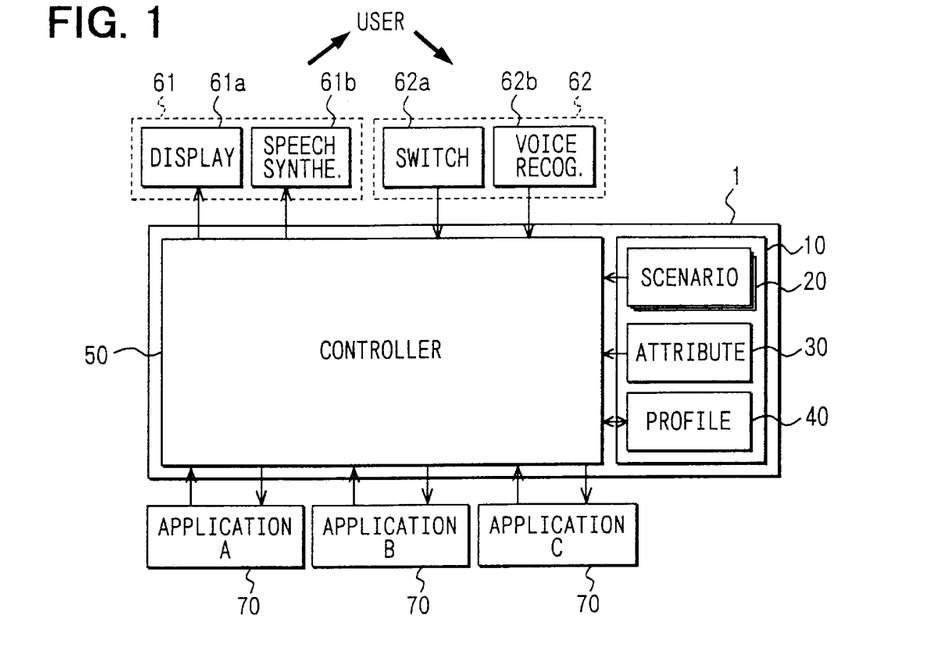
FIG. 1 is a block diagram showing an interactive system including a preferred embodiment of an interactive-type user interface device according to the invention.

Referring first to FIG. 1, an interactive system for a vehicle navigation or the like has an interactive-type user interface device (interactive device) 1. This interactive system further has output devices 61, input devices 62, and application programs (APs) 70. This interactive system is mounted in a vehicle for controlling equipment inside a passenger compartment of the vehicle through interaction with a user.

The interactive device 1 has a storage device 10 and a controller 50. The storage device 10 stores various types of data. The storage device 10 may be realized with RAM or the like, or with a hard disc drive or the like. Stored in the storage device 10 are a scenario 20, an attribute table 30 and a profile 40. The controller 50 is a computer system having a CPU, ROM, RAM and I/O devices.

The scenario 20 is a description of operations of the controller 50. The attribute table 30 is a dictionary for classifying information inputted from a user by way of the input devices 62. The profile 40 is a description in a predetermined form of common data that can be used commonly and shared by the APs 70. The details of the attribute table 30 and the profile 40 will be discussed later in an explanation of the operation of the system.

The output devices 61 include a display device 61a and a speech synthesizing device 61b. The display device 61a is for requesting input of information from the user and reporting results of processing carried out by the APs 70 by means of a display. The speech synthesizing device 61b is for requesting input of information from the user and for reporting results of processing carried out by the APs 70 by means of a synthesized speech.

The input devices 62 include operating switches 62a and a speech recognition device 62b. The operating switches 62a are for the user to input information by switch operation. The speech recognition device 62b is for the user to input information by speech.

The APs 70 are programs for realizing predetermined functions. In this interactive system there are three APs (A, B and C) 70. When in the following explanation the APs 70 are to be distinguished from each other, they will be assigned the letters A through C as shown in FIG. 1 and referred to as A-AP 70, B-AP 70 and C-AP 70. To keep the following explanation specific, the A-AP 70 will be assumed to be a navigation program for performing route guidance; the B-AP 70 a search program for performing data searches such as a restaurant search; and the C-AP 70 an audio program for controlling a CD player.

An important characteristic of the interactive system of this preferred embodiment lies in the construction of the scenario 20. The scenario 20 is a description of operating information expressing predetermined operations. The controller 50 operates in accordance with this scenario 20. That is, the controller 50 analyzes the operating information and performs operations corresponding therewith. This operating information includes dialogue information for realizing dialogues with the user. Dialogue includes not only vocal communication but also other type of communications such as electronic communication through switches and displays.

Figure 2:
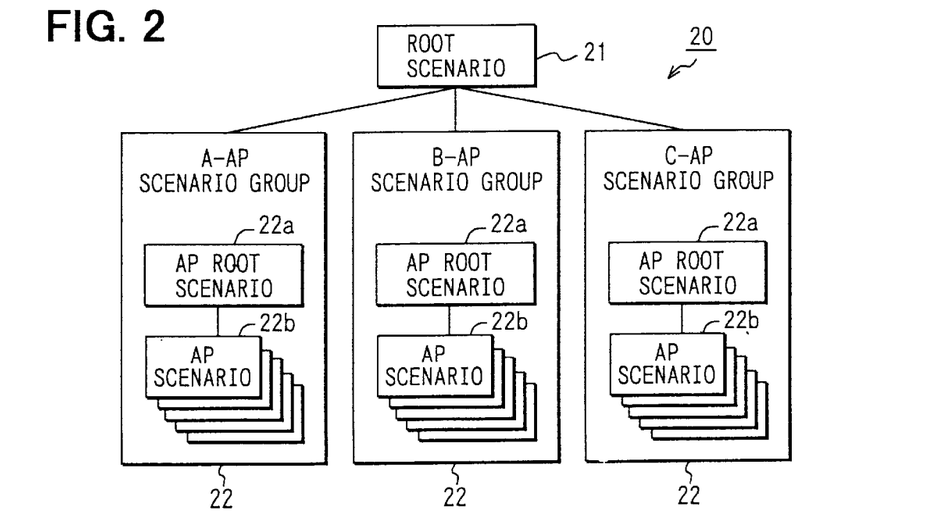
FIG. 2 is a block diagram illustrating a hierarchy of scenarios stored in a storage device in the embodiment.

As shown in FIG. 2, the scenario 20 is made up of a root scenario 21 and a plurality of AP scenario groups 22. The AP scenario groups 22 are scenario groups for acquiring information needed by the APs (A, B and C) 70. These groups are provided in correspondence with the APs 70. In FIG. 2, the AP scenario groups 22 are shown with the letters A through C to indicate their correspondence with the APs (A, B and C) 70. The root scenario 21, on the other hand, is a scenario for starting one of the APs 70 and loading the AP scenario group corresponding to that AP 70.

Each of the AP scenario groups 22 is made up of an AP root scenario 22a and a plurality of AP scenarios 22b. The AP scenarios 22b contain dialogue information, which is one type of the above operating information. In each of the AP scenarios 22b, dialogue information relating to a predetermined topic is described. The dialogue information is made up of a device side inquiry (request information), expected user responses to that inquiry (expected input information), and information of branches to other operating information respective to those responses (branch information). The AP root scenario 22a is a scenario for effecting branching to the AP scenarios 22b.

The operation of the interactive system of this preferred embodiment will now be explained.

As described above, the controller 50 operates in accordance with the scenario 20. That is, the controller 50 executes processing based on the root scenario 21 (root scenario processing) or processing based on an AP scenario group 22 (AP scenario group processing) AP scenario group processing is either processing based on an AP root scenario 22a (AP root scenario processing) or processing based on an AP scenario 22b (AP scenario processing). The root scenario processing referred to here is equivalent to application branch processing, and the AP scenario group processing is equivalent to interactive processing. Within AP scenario group processing, AP root scenario processing is equivalent to interactive branch processing, and AP scenario processing is equivalent to unit interactive processing.

First, the basic flow of processing will be described.

When this interactive system is activated, root scenario processing is executed. As a result of this root scenario processing, the AP 70 is started and the AP scenario group 22 corresponding to that AP 70 is loaded. Then, processing proceeds from root scenario processing to AP scenario group processing. In this AP scenario group processing, information needed by the AP 70 is acquired. When the AP scenario group processing finishes, root scenario processing is executed again.

When the AP scenario group processing is executed, first, the AP root scenario processing is executed. That is, processing proceeds from the root scenario processing to the AP root scenario processing. Then, processing proceeds from the AP root scenario processing to the AP scenario processing. The information needed by the AP 70 is acquired through a dialogue with the user conducted by the AP scenario processing based on the above dialogue information.

Specific information acquisition and switching between APs 70 will now be described. The explanation will be divided into eight sections (a) through (h).

(a) First, using the flow chart of FIG. 3, a step-by-step explanation of the AP scenario group processing will be given. In this explanation, it is assumed that a spoken dialogue is being carried out, by way of the speech synthesizing device 61b and the speech recognition device 62b. Here, a case wherein the A-AP 70 for performing route guidance has been started and the AP scenario group processing corresponding to the A-AP 70 (A-AP scenario group processing) is being executed is considered.

First, at step (S) 1000, an input request is made. This is based on request information in dialogue information. For example, the speech "Please input destination." is outputted through the speech synthesizing device 61b. When there is an utterance from the user in response to this, the response is compared with expected input information at S1010.

Then, at S1020, on the basis of the result of this comparison, it is determined whether or not the response from the user matches the expected input information. When here it is determined that the response matches the expected input information (S1020: YES), branch processing based on branch information is carried out (S1030). This branch processing is within the A-AP scenario group processing. This kind of input request processing, comparison processing and branch processing is repeated thereafter (not shown) until all the information needed by the A-AP 70 is acquired, whereupon this information is reported to the A-AP 70 and then the A-AP scenario group processing ends.

When on the other hand it is determined that the response from the user does not match the expected input information (S1020: NO), processing proceeds to root scenario processing. At this time, the inputted information is transferred to the root scenario processing.

At S2000 of the root scenario processing, on the basis of the transferred inputted information, it is determined whether or not another AP 70 is corresponding to the inputted information. When there is a corresponding other AP 70 (S2000: YES), the corresponding AP 70 is started (S2010), and the AP scenario group 22 associated with that AP 70 is loaded (S2020). For example when the inputted information is "I want to search for an Italian restaurant in Nagoya City.", the B-AP 70, which is a search program, is started. The B-AP scenario group 22, which corresponds to the B-AP 70, is loaded. Then, processing proceeds to AP scenario group processing based on that B-AP scenario group 22 (B-AP scenario group processing). At this time, the inputted information is transferred to the B-AP scenario group processing.

When on the other hand there is no corresponding AP 70 (S2000: NO), processing proceeds to S1040 in the A-AP scenario group processing. In this case, in the A-AP scenario group processing, the input request is made again (S1040), and the processing from S1020 is repeated.

In the B-AP scenario group processing, in S3000, processing based on the inputted information is carried out. Processing based on the inputted information means comparison processing comparing the inputted information with expected input information and branch processing based on branch information. For example, when the inputted information is "I want to search for an Italian restaurant in Nagoya City.", the pieces of information 'Nagoya City' and 'Italian restaurant' are compared with expected input information, and branching is carried out on the basis of the results of the comparisons. In this way, some of the information needed by the search program B-AP 70 is acquired. Then, at S3010, it is determined whether or not there was a finish instruction from the user. When here there was a finish instruction (S3010: YES), the controller 50 ends the B-AP scenario group processing and proceeds to root scenario processing. That is, in this case the A-AP scenario group processing is not executed again. When on the other hand there was no finish instruction (S3010: NO), processing proceeds back to S1000 of the A-AP scenario group processing.

(b) Here, the AP scenario group processing of FIG. 3 will be explained in detail using the flow chart of FIG. 4.

In a certain AP scenario processing (AP scenario processing (1)), an input request is made (S4000); a comparison with expected input information is carried out (S4010); and if the inputted information matches the expected input information (S4020: YES), branch processing is carried out within that AP scenario processing (1) (S4030). When the inputted information does not match the expected input information (S4020: NO), processing proceeds back to the AP root scenario processing. At this time, the inputted information is transferred to the AP root scenario processing.

In the AP root scenario processing, it is determined whether or not there is an AP scenario able to respond to the inputted information (S5000). If there is an AP scenario able to respond (S5000: YES), processing proceeds to a different AP scenario processing (AP scenario processing (2)). At this time, the inputted information is transferred on to the AP scenario processing (2). If on the other hand there is no AP scenario able to respond (S5000: NO), processing proceeds to the root scenario processing. This shift to the root scenario processing is the one that occurs in the case of a negative determination (NO) being made at S1020 of FIG. 3. That is, specifically, when the inputted information does not match the expected input information (S4020: NO), and also there is no AP scenario able to respond (S5000: NO), processing proceeds to the root scenario processing. If there is no corresponding AP (S2000: NO in FIG. 3) in the root scenario processing, the AP root scenario processing is executed again and an input request is made again (S5010). Processing then proceeds to S4010 in the AP scenario processing (1).

In the AP scenario processing (2), processing based on the inputted information is carried out (S6000). Processing based on the inputted information means comparison processing comparing the inputted information with expected input information and branch processing based on branch information. When the AP scenario processing (2) ends, processing proceeds via the AP root scenario processing to the AP scenario processing (1).

Figure 3:
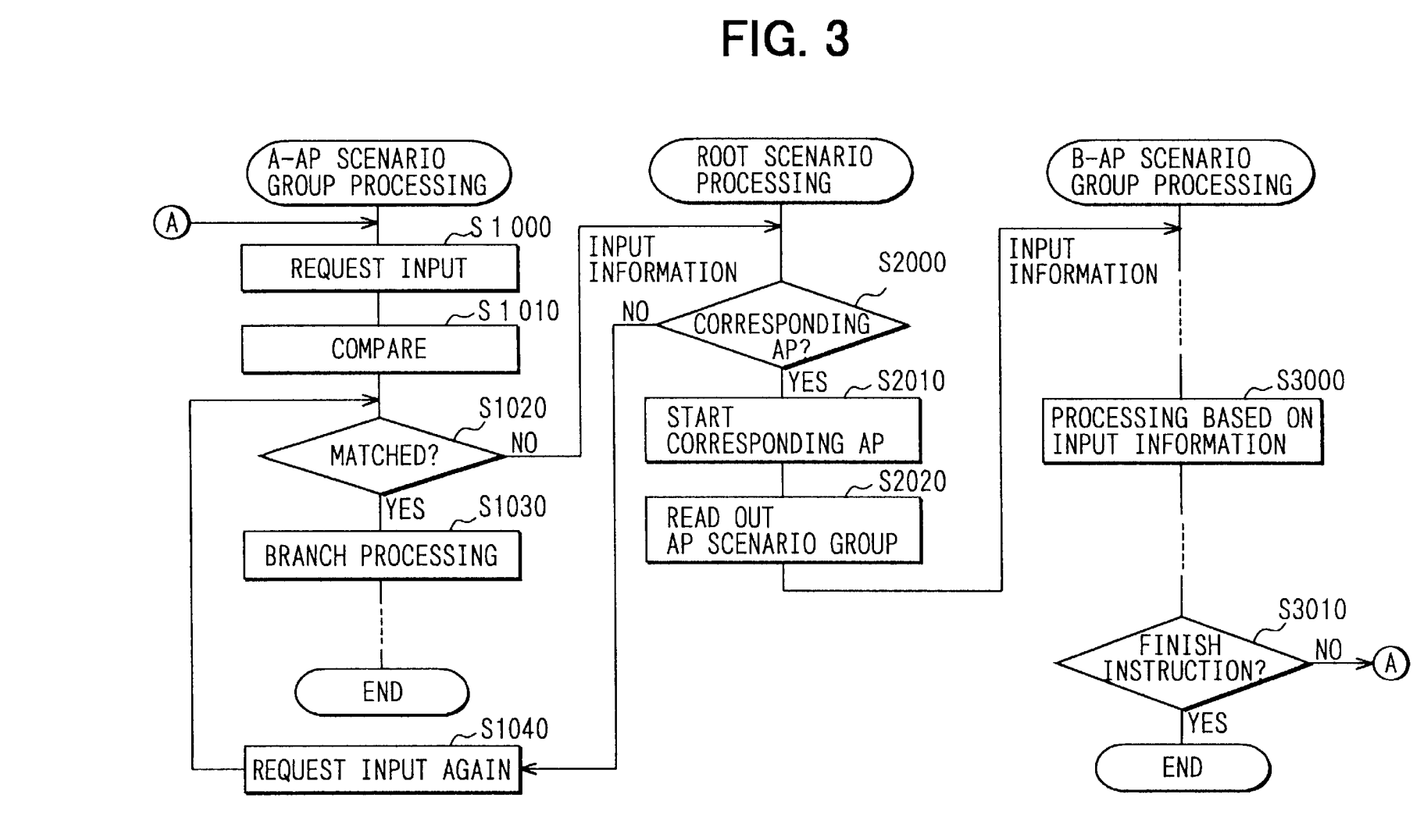
FIG. 3 is a flow chart showing transitions between AP scenario group processing and root scenario processing in the embodiment.
Figure 4:
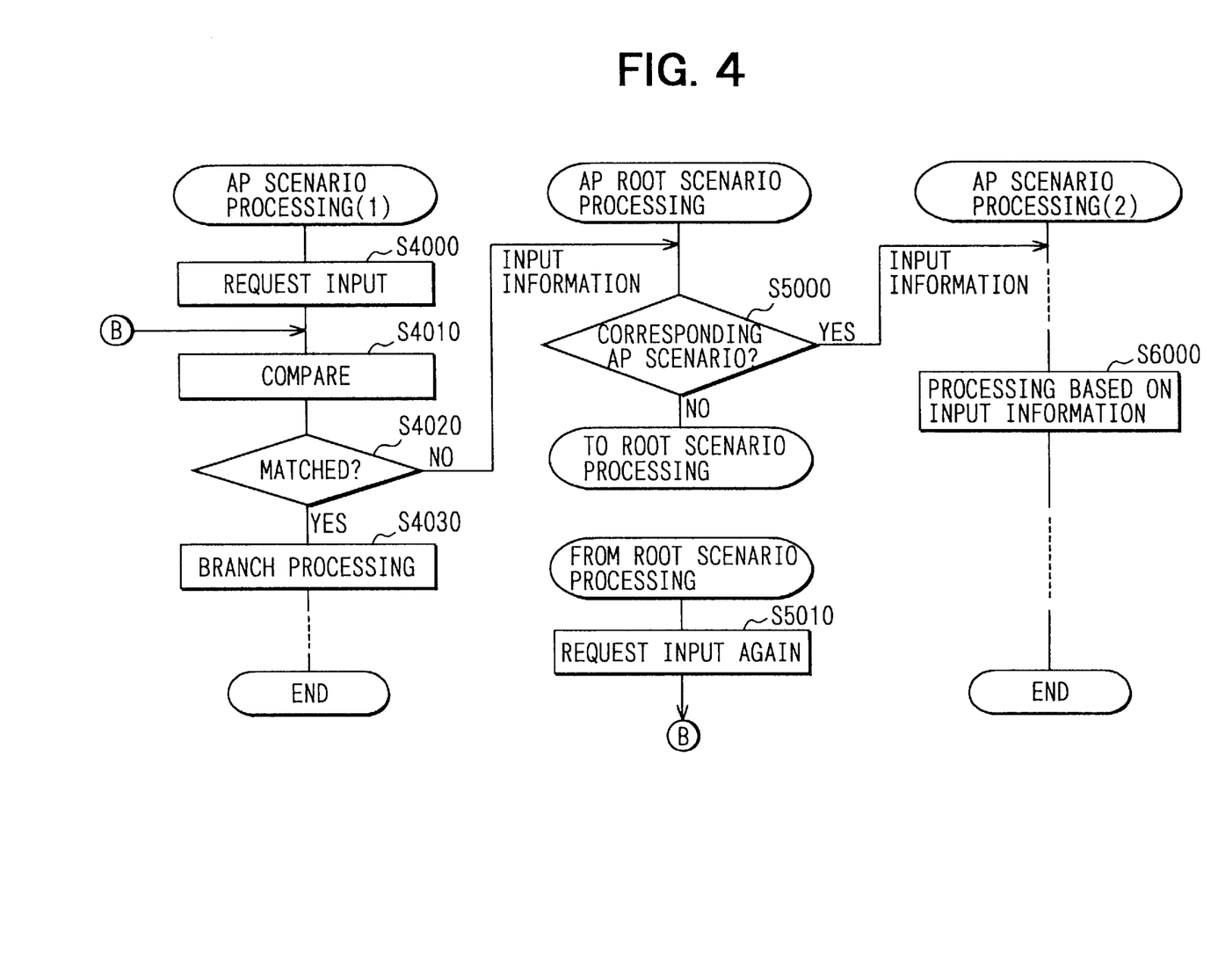
FIG. 4 is a flow chart showing transitions between AP scenario processing and AP root scenario processing in the embodiment.

(c) At S3010 of FIG. 3, on the basis of whether or not there was a finish instruction from the user, processing proceeds to AP scenario group processing or proceeds to root scenario processing. It is determined whether to finish as far as the A-AP scenario group processing, which had been interrupted. This will now be explained.

As mentioned above, in this interactive system, when in AP scenario group processing inputted information other than expected input information is inputted (S1020: NO in FIG. 3), processing proceeds to the root scenario processing and another AP 70 is started in accordance with the inputted information (S2010) and processing proceeds to the AP scenario group processing of this other AP 70.

Figure 5:
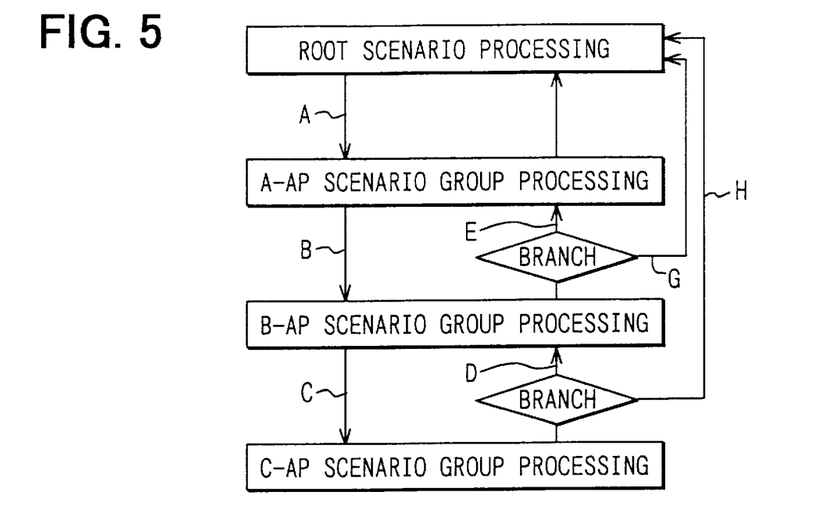
FIG. 5 is a block diagram illustrating branch processing executed on completion of AP scenario group processing in the embodiment.

Therefore, for example as shown in FIG. 5, processing can shift from the root scenario processing to the A-AP scenario group processing as shown by A in FIG. 5, interrupt this A-AP scenario group processing part-way through it, and shift via the root scenario processing to the B-AP scenario group processing as shown by B in FIG. 5. Further, this B-AP scenario group processing may be interrupted, and a shift made via the root scenario processing to the AP scenario group processing corresponding to the C-AP 70 (C-AP scenario group processing) as shown by C in FIG. 5. In this way, it is possible to switch between APs 70 part-way through a dialogue and acquire information needed by the post-switch AP 70. When the C-AP scenario group processing ends, processing can shift to the interrupted B-AP scenario group processing as shown by D in FIG. 5. When the B-AP scenario group processing ends, processing can shift to the interrupted A-AP scenario group processing as shown by E in FIG. 5. However, it may happen that after the C-AP scenario group processing is ended, execution of the A- and B-APs 70 is not necessary. There is a possibility of the user himself or herself not remembering how far a dialogue has proceeded in the A-AP or B-AP scenario group processing. For this reason, branch processing of the kind shown in S3010 of FIG. 3 (branch in FIG. 5) is provided. When a finish instruction from the user processing does not shift back to the A-AP or B-AP scenario group processing, processing proceeds directly back to the root scenario processing (G, H in FIG. 5).

(d) Next, the transfer of inputted information will be explained on the basis of FIG. 6. In this interactive system, a set of information including multiple pieces of information can be inputted as inputted information from the user. For example, the inputted information "I want to search for an Italian restaurant in Nagoya City." includes the pieces of information 'Nagoya City', 'Italian food', and 'search'.

Figure 6:
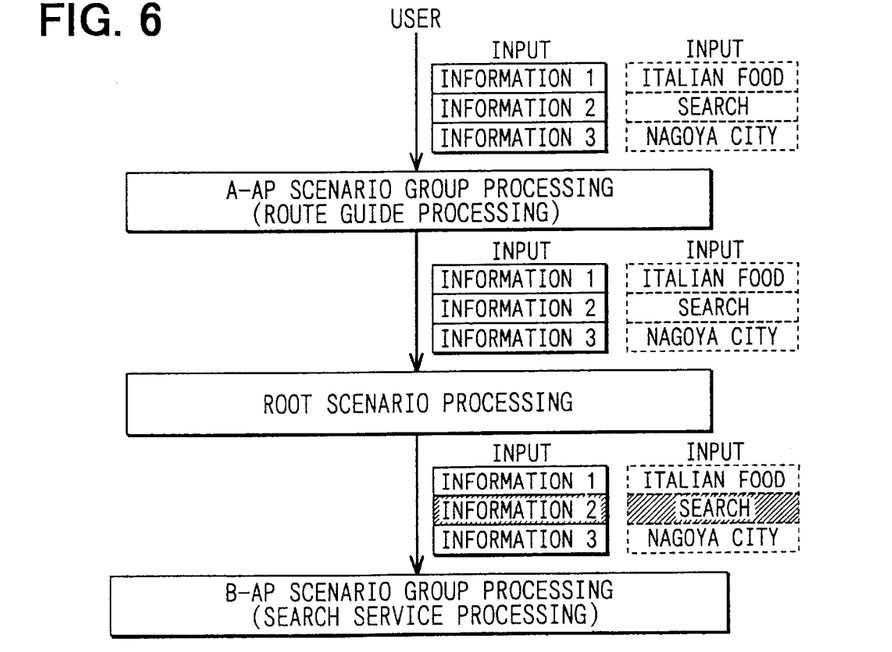
FIG. 6 is a block diagram illustrating the transfer and processing of inputted information made up of a plurality of different pieces of information in the embodiment.

As shown in FIG. 6, when inputted information made up of multiple pieces of information is inputted by the user and a shift in processing occurs, those pieces of information are transferred. For example, when inputted information includes a piece of information 1, a piece of information 2 and a piece of information 3. When these pieces of information do not all match the expected input information and A-AP scenario group processing cannot respond, the pieces of information 1 through 3 are transferred to the root scenario processing. In this case, in the root scenario processing, on the basis of at least one of the pieces of information 1 through 3, it is determined whether or not there is a corresponding AP 70. At this time, for example, it will be assumed that on the basis of the piece of information 2 it is determined that the B-AP 70 is corresponding and processing proceeds to the B-AP scenario group processing. In this case, the inputted information appended with flag information to the effect that processing of the piece of information 2 is done (shown by hatching in the piece of information 2 column in FIG. 6) is transferred to the B-AP scenario group processing. On this basis, in the B-AP scenario group processing, processing based on the pieces of information 1 and 3 is executed.

Specifically, for example, when as mentioned above "I want to search for an Italian restaurant in Nagoya City." has been inputted, the piece of information 1 is 'Italian food', the piece of information 2 is 'search', and the piece of information 3 is 'Nagoya City'. In this case, in the root scenario processing, the B-AP 70, which is a search program, is started on the basis of the piece of information 2, 'Search', and processing proceeds to the B-AP scenario group processing. In the B-AP 70, the pieces of information 1 and 3, 'Italian food' and 'Nagoya city' are acquired as at least some of the search conditions needed by the B-AP 70.

(e) In this interactive system, the controller 50 classifies the inputted information on the basis of the above attribute table 30. This is for carrying out branch destination determinations when there are multiple pieces of information as discussed above, and also for determining sameness of inputted information. An example of this attribute table 30 is shown schematically in FIG. 7.

Figure 7:
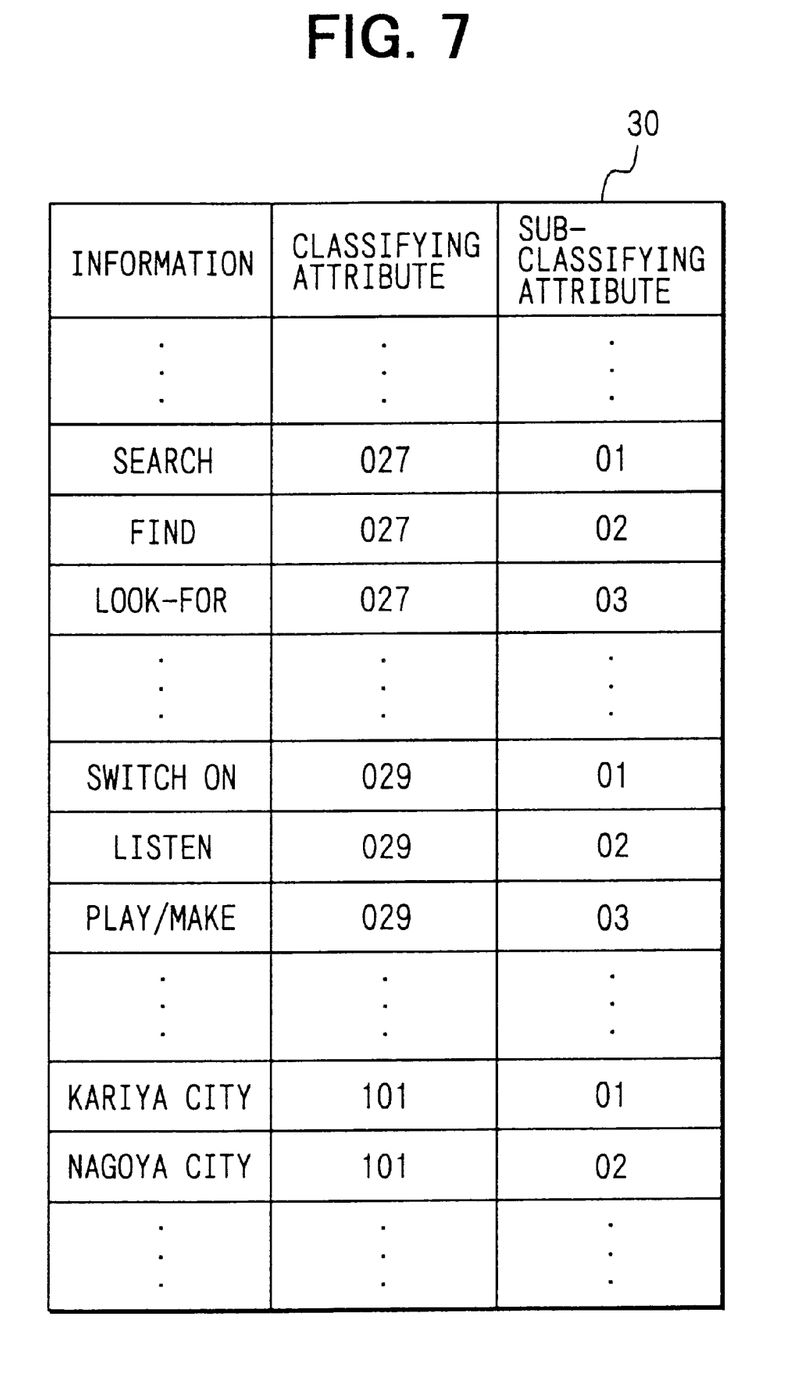
FIG. 7 is a table illustrating schematically an attribute table in the embodiment.

In the attribute table 30 are stored classifying attributes and sub-classifying attributes to be associated with inputted pieces of information. For example, with respect to the piece of information 'search', the classifying attribute '027' and the sub-classifying attribute '01' are stored. Similarly, the classifying attribute '027' and the sub-classifying attribute '02' are associated with 'find', and the classifying attribute '027' and the sub-classifying attribute '03' are associated with 'look for'. The classifying attribute '029' and respectively the sub-classifying attributes '01', '02', '03' are associated with the pieces of information 'switch on', 'listen' and 'play (a CD)/make (a call)'. The classifying attribute '101' is associated with 'Karigaya City' and 'Nagoya City', while their respective sub-classifying attributes are '01' and '02'. That is, pieces of information belonging to the same category are given the same classifying attribute, and pieces of information with the same classifying attribute are sorted further by the sub-classifying attributes.

With respect to inputted information from the user, the controller 50 of this interactive device 1 first refers to the attribute table 30 and acquires classifying attributes and sub-classifying attributes, and then uses these classifying attributes and sub-classifying attributes to execute the various processing discussed above. Specifically, it operates as explained below [1] to [3].

[1] First, using the classifying attributes, the controller 50 divides the inputted information from the user into operation request information and accompanying information relating to the operation request information. The operation request information is information indicating an operation of an AP 70 desired by the user. On the basis of this, for example in the root scenario processing, branch processing is carried out using this operation request information. For example, with the inputted information "I want to search for an Italian restaurant in Nagoya City." mentioned above, the operation request information is 'search' and the accompanying information is 'Italian food' and 'Nagoya City'. Accordingly, on the basis of the operation request information 'search', the search program B-AP 70 is started.

[2] The same classifying attribute determination leads to execution of the same processing. For example, with respect to any of the pieces of inputted information "I want to search for a restaurant.", "I want to find a restaurant.", and "I want to look for a restaurant.", the classifying attribute '027', which is operation request information, is acquired and the same processing is carried out. Specifically, the search program B-AP 70 is started in the root scenario processing and then processing proceeds to the B-AP scenario group processing. For example, with respect to any of the pieces of inputted information "I want to switch on a CD player.", "I want to listen to a CD." and "I want to play a CD.", the classifying attribute '029' is acquired as operation request information and the same processing is carried out. In this case, specifically, the C-AP 70, which is an audio program, is started in the root scenario processing and then processing proceeds to the C-AP scenario group processing.

[3] A sub-classifying attribute determination is carried out, which may lead to different processing being executed even if the classifying attribute is the same. For example, whereas one might say "I will make a telephone call.", one does not normally say "I will play a telephone." or "I want to hear the telephone.". On the other hand, whereas one might say "I want to play back my messages." or "I want to hear my messages.", one would not generally say "I want to play my messages.". Accordingly, for example in a system incorporating an in-car telephone, when the piece of information 'make' is inputted, a dialogue starting with "What number would you like to call?" would be initiated. Conversely, when the piece of information 'play back', or 'hear', is inputted, a dialogue starting with "Would you like to hear your messages?" might be initiated.

(f) Next, improvements in the AP scenarios 22*b* will be explained. It has been described that dialogue information is stored in the AP scenarios 22*b*. At this time, in this preferred embodiment, the following improvements [1] and [2] are employed.

[1] Request information, expected input information and branch information constituting dialogue information do not have to be described directly in the respective AP scenario 22*b*. That is, at least one of these three types of information can be stored in a predetermined area outside and pointing information for pointing to the information stored in this predetermined area then stored in the AP scenario 22*b*. When pointing information is stored in an AP scenario 22*b*, in AP scenario processing the controller 50 loads from outside the information pointed to by that pointing information and operates on the basis of the information thus read out.

[2] Request information, expected input information or branch information can be stored in addition to the above pointing information. In this case, the controller 50 operates on the basis of both information read out from outside on the basis of the pointing information and information stored directly.

(g) Next, improvements of AP scenario processing based on the AP scenario 22b discussed above will be explained. In AP scenario processing, basically, as discussed above, an input request is made (S4000), and a comparison with expected input information is carried out (S4010). If the inputted information matches the expected input information (S4020: YES), branch processing is carried out (S4030). At this time, in branch destination processing, rewriting of the expected input information and branch information to be used in the next comparison processing and interactive processing can be carried out. That is, information relating to expected input information and branch information setting can be described as branch destination operating information in the AP scenario 22b, and the controller 50 will rewrite expected input information and branch information on the basis of this setting information. This will be explained using the flow chart of FIG. 8.

Figure 8:
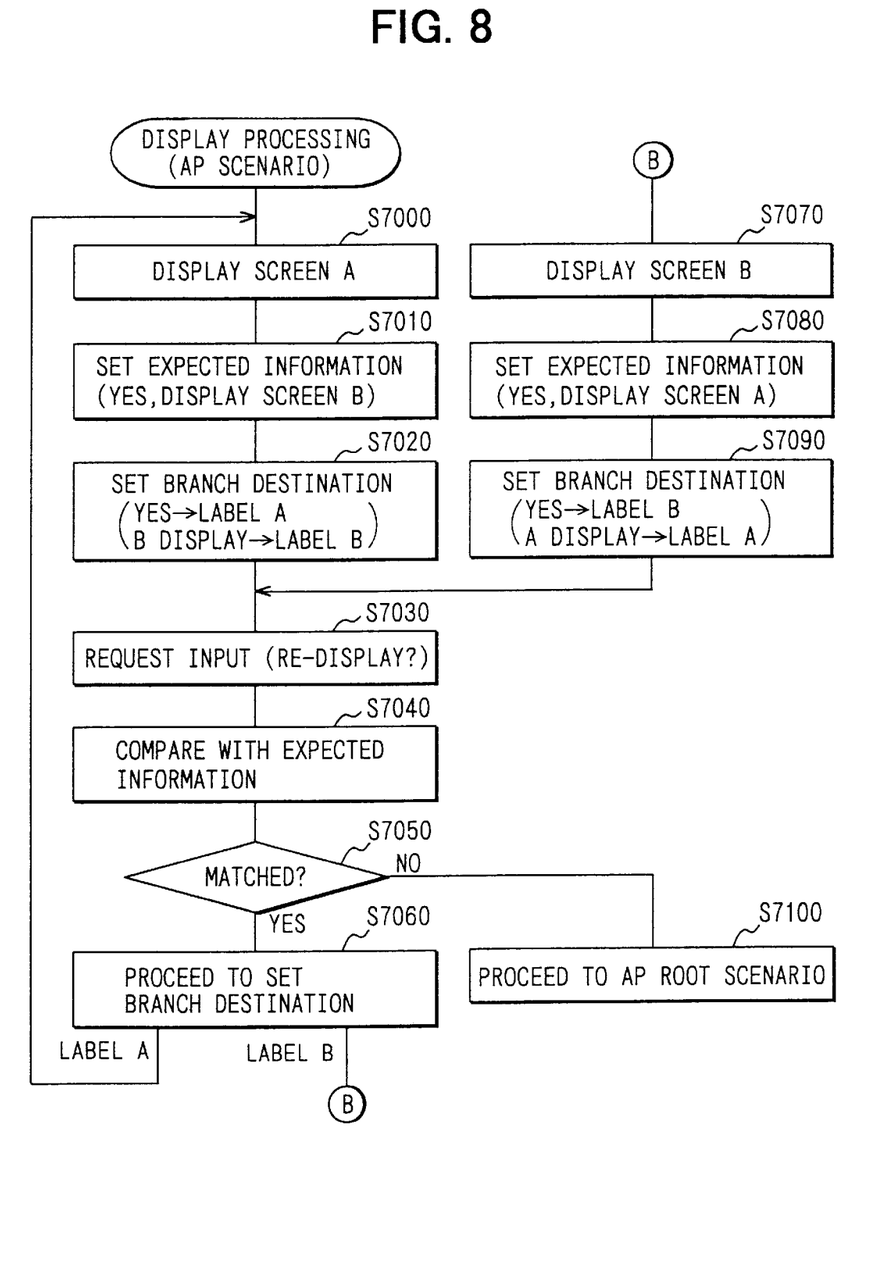
FIG. 8 is a flow chart illustrating rewriting expected input information and branch information in the embodiment.

FIG. 8 shows screen display processing constituting a certain AP scenario processing. This processing is for displaying one or the other of two screens, screens A and B, and carries out the re-display (updated display) of screens, with the premise of displaying information which gradually changes with time, such as information from the internet.

After the start of processing, first screen A is displayed (S7000). Then, setting of expected input information (S7010) and setting of branch destinations (S7020) is carried out. Specifically, 'Yes' and 'Display screen B' are set as expected input information, and a label A is set on a branch destination for 'Yes' and a label B is set on a branch destination for 'Display screen B'.

Input request processing is then carried out (S7030). Here, the input request "Would you like to re-display?" is made. A comparison with expected input information is carried out (S7040). If the response matches the expected input information (S7050: YES), the set branch destination is inferred (S7060) and the processing shifts. That is, if "Yes." is inputted with respect to a "Would you like to re-display?" following the display of screen A, processing proceeds to the label A, i.e. S7000, and re-display of screen A is carried out. On the other hand, if "Display screen B." is inputted, processing proceeds to the label B, i.e. S7070. On the other hand, if the response does not match the expected input information (S7050: NO), processing proceeds to AP root scenario processing (S7100). This processing is equivalent to the processing carried out when a negative determination is made at S4020 in FIG. 4.

At S7070, the screen B is displayed. Then, expected input information is set (S7080) and branch destination setting is carried out (S7080). In this case, 'Yes' and 'Display screen A' are set as expected input information, and the label B is set on the branch destination for 'Yes' and the label A is set on the branch destination for 'Display screen A'. The processing of S7030 onwards is then repeated. Thus, if "Yes." is inputted with respect to "Would you like to re-display?" following the display of screen B, processing proceeds to the label B, i.e. S7070, and re-display of screen B is carried out. If on the other hand "Display screen A." is inputted, processing proceeds to the label A, i.e. S7000.

In this way, even when with respect to the input request "Would you like to re-display?" the same information "Yes." is inputted, the operation can be changed so that the screen being displayed at that time is re-displayed.

(h) In this preferred embodiment a profile 40, in which common data that can be used commonly by the APs 70 is described in a predetermined form, is stored in the storage device 10. This profile 40 will now be explained.

Figure 9A:
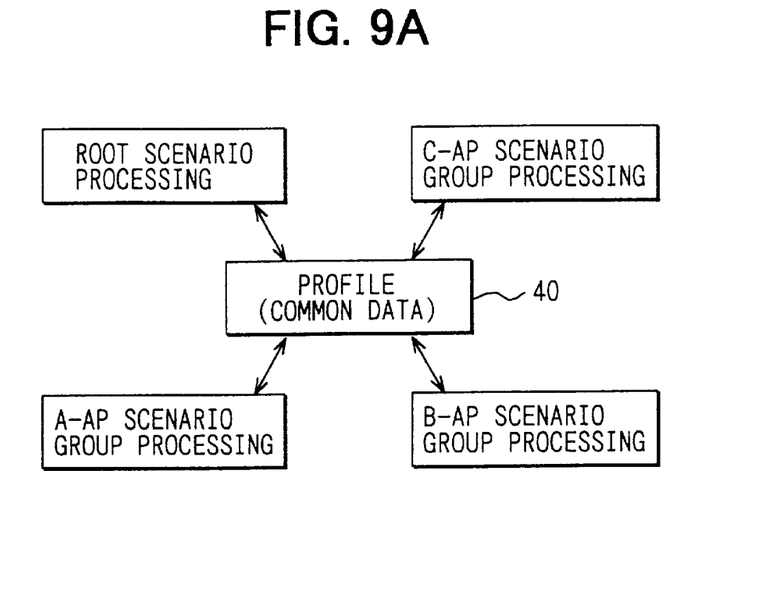
FIG. 9A is a block diagram illustrating a reference relationship between a profile and different types of processing in the embodiment.

The profile 40 can be accessed from the root scenario processing and from any of the AP scenario group processing blocks A through C, as shown in FIG. 9A, and the controller 50 stores acquired information in the profile 40 in a predetermined form. Here, being accessible from AP scenario group processing means being accessible from AP root scenario processing and from AP scenario processing.

Figure 9B:
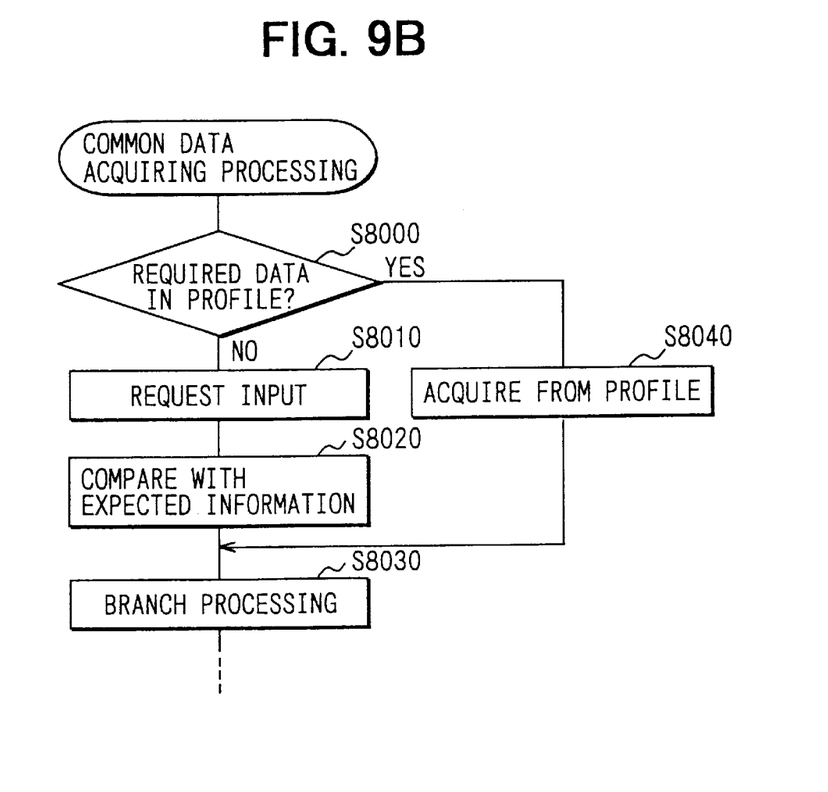
FIG. 9B is a flow chart showing common data acquisition processing in the embodiment.

In this case, as shown in FIG. 9B, in for example AP scenario processing, it is determined before an input request is made whether or not the required data is stored in the profile 40 (S8000). If the required data is there (S8000: YES), that data is acquired from the profile 40 (S8040). Then, processing proceeds to branch processing (S8030). If on the other hand the required data is not there (S8000: NO), the input request is made (S8010), and a comparison with expected input information is carried out (S8020). The processing proceeds to branch processing (S8030) after that. In the comparison processing (S8020), the inputted information may be stored in the profile 40.

Next, effects of the interactive system of this preferred embodiment will be explained.

In the interactive device 1 of this preferred embodiment, processing for starting the APs 70A through 70C and processing for loading the AP scenario groups 22 of the APs 70 are separated from the AP scenario groups 22 of the APs 70 and described together in the root scenario 21 (FIG. 2). As a result, it is not necessary to describe processing for shifting to other AP scenario groups 22 in each of the AP scenario groups 22. Thus, even if there are many APs 70 there are, the description of the AP scenario groups 22 remains simple. That is, the description of scenarios for switching among APs 70 in the course of a single dialogue and also realizing interactive processing, i.e. the AP scenario groups 22, does not become complicated.

In the interactive device 1 of this preferred embodiment, as explained above in (a), when in an AP scenario group processing inputted information of which processing is not possible is inputted (S1020: NO in FIG. 3), root scenario processing is executed. That is, switching is made from AP scenario group processing to root scenario processing. As a result, determination of the inputted information from the user is swift, and the possibility of an AP 70 not intended by the user being erroneously started can be decreased. This is because when inputted information relevant to both the AP scenario group processing and the root scenario processing is inputted, its evaluation in AP scenario group processing is carried out first.

Also, when in root scenario processing there is no corresponding AP (S2000: NO in FIG. 3), processing proceeds back to the interrupted AP scenario group processing and makes an input request again (S1040). By this means it is possible to handle cases where a speech recognition device 62b is used and particularly when due to ambient noise or the like it is erroneously determined that inputted information not among the expected input information has been inputted, and the possibility of an AP 70 not intended by the user being erroneously started can be decreased further.

In the interactive device 1 of this preferred embodiment, each of the AP scenario groups 22 is made up of an AP root scenario 22a and multiple AP scenarios 22b (FIG. 2). As explained in (b) above, when information other than expected input information is inputted (S4020: No in FIG. 4), in AP root scenario processing, it is determined whether or not there is the AP scenario 22b capable of responding (S5000), and a transition to AP scenario 22b may be carried out. That is, the separated construction of the root scenario 21 and the AP scenario groups 22 is also applied within the AP scenario groups 22. As a result, it is not necessary for shift processing for topic changes to be described in the AP scenarios 22b, and the description of the AP scenario groups 22 becomes simpler. Also, because the different blocks of processing are executed in the order of AP scenario processing→AP root scenario processing→AP scenario processing (or sometimes root scenario processing) (FIG. 4), the determination of the inputted information from the user is swift and topic changes not intended by the user can be minimized. This is because, unlike when AP scenario processing and AP root scenario processing are executed in parallel, it ceases to happen that inputted information which should be evaluated in AP scenario processing is evaluated in AP root scenario processing.

Further, in the interactive device 1 of this preferred embodiment, as explained in (c) above, it is determined on the basis of a finish instruction from the user whether to re-execute the interrupted AP scenario group processing or to shift to root scenario processing (S3010 in FIG. 3, and FIG. 5). This provides the convenience that for example after playing a CD in the middle of setting a destination for route guidance it is possible to go back to the setting of the destination. When for example part-way through setting a destination a search for a restaurant or the like is carried out and as a result the destination is changed, the processing of setting the destination can be finished.

To the interactive device 1 of this preferred embodiment, as explained above in (d), it is possible to input information such as "I want to search for an Italian restaurant in Nagoya City.", which includes the multiple pieces of information 'in Nagoya City', 'Italian food', and 'search'. These inputted pieces of information are transferred between the AP scenario group processing and the root scenario processing, and used in both types of processing (FIG. 3, FIG. 6). They are also transferred between the AP root scenario processing and the AP scenario processing, within the AP scenario group processing, and used in both of these types of processing (FIG. 4). In this way, it becomes unnecessary for the same pieces of information to be inputted numerous times, and the user input operation becomes extremely simple. In addition, as explained above in (h), a profile 40 accessible from all the different types of processing is stored (FIG. 9A), and common data which can be used commonly by different blocks of processing is acquired from the profile 40 before an input request is made (FIG. 9B). In this way also, a contribution is made to simplification of the user input operation.

Furthermore, as explained above in (e), on the basis of an attribute table 30 (FIG. 7), classifying attributes and sub-classifying attributes are acquired for inputted pieces of information from the user. The different types of processing are carried out on the basis of the classifying attributes and, as necessary, the sub-classifying attributes. As a result of classifying attributes and sub-classifying attributes being used like this, the descriptions of the AP scenarios 22b are simplified. This is because for example instead of descriptions such as 'search', 'find' and 'look for', it is sufficient for example to describe expected input information as '027'. As a consequence of the use of classifying attributes, the user can make various information inputs such as "I want to search for a restaurant.", "I want to find a restaurant.", and "I want to look for a restaurant.". That is, the user is freed from having to input fixed commands. As a consequence of the use of sub-classifying attributes, dialogues appropriate to various situations can be realized. As a result, intuitive user information input is possible.

Also, in this preferred embodiment, as explained in (f) above, pointing information can be described in the AP scenarios 22b. In this way also the AP scenario groups 22 can be made simple. Because expected input information and branch information constituting dialogue information can be rewritten, as explained in (g) above, more natural dialogues can be realized.

The controller 50 of the interactive device 1 is equivalent to 'control means', and the storage device 10 is equivalent to 'table storing means', and 'common data storing means'.

The invention is not limited by the preferred embodiment discussed above, and various changes can be made without deviating from the scope of the invention.

For example, the invention can be similarly applied to dialogues using the display device 61a and the operating switches 62a as opposed to a spoken dialogue using the speech synthesizing device 61b and the speech recognition device 62b. However, since with information input using the operating switches 62a there would probably be more selection-type inputting of information, the particular characteristics of an interactive system according to the present invention would be better exploited by its application to spoken dialogues.

The interactive system according to the invention can of course be constructed to control any of the many and various APs that have come into use in recent years, such as the above AP for operating an in-car telephone, an AP for operating a television receiver, an AP for operating an air-conditioner, and an AP for realizing cruise control in a vehicle equipped with cruise control.

What is claimed is:

1. An interactive-type user interface device for use with respect to a plurality of applications, the device comprising:
   control means for acquiring information needed by the applications through an interaction with a user and sending the information to the applications, by executing interactive processing based on application scenario groups provided in one-to-one association with the applications, wherein:
   a root scenario is provided separately from the application scenario groups for realizing application branch processing which selects and starts an application corresponding to inputted information and loads the application scenario group associated with that application;
   the control means is capable of executing interactive processing based on another of the application scenario groups part-way through the interactive processing based on one of the application scenario groups, by executing application branch processing based on the root scenario;
   each of the application scenario groups describes therein at least dialogue information made up of request information for making an input request requesting information needed by the respective application, expected input information expected to be inputted in response to the input request, and branch information corresponding to the expected input information;
   the control means carries out, as the interactive processing, input request processing based on the request information, comparison processing which compares inputted information with the expected input information, and branch processing based on results of this comparison; and the interactive processing is interrupted and application branch processing is executed based on the root scenario, when an application scenario group information is input part-way through interactive processing, the application scenario group information not among the expected input information.

2. An interactive-type user interface device as in claim 1, wherein:

the control means re-executes the interrupted interactive processing and provides a prompt to re-input information, if an application corresponding to the inputted information cannot be selected in the application branch processing.

3. An interactive-type user interface device as in claim 1, wherein:

the control means transfers the inputted information between the interactive processing and the application branch processing when necessary, and uses it in both types of processing.

4. An interactive-type user interface device as in claim 1, wherein each of the application scenario groups includes:

application scenarios, each describing therein dialogue information relating to a predetermined topic and being for realizing unit interactive processing constituting a part of the interactive processing; and an application root scenario for realizing interactive branch processing for branching the inputted information to unit interactive processing of the different application scenarios.

5. An interactive-type user interface device as in claim 4, wherein:

the control means interrupts the unit interactive processing and executes the interactive branch processing based on the application root scenario, when an application scenario inputted information not among the expected input information of that application scenario is inputted part-way through the unit interactive processing.

6. An interactive-type user interface device as in claim 5, wherein:

the control means executes application branch processing based on the root scenario, if branching corresponding to the inputted information is impossible on the basis of the interactive branch processing.

7. An interactive-type user interface device as in claim 5, wherein:

the control means transfers the inputted information between the unit interactive processing and the interactive branch processing when necessary, and uses it in both types of processing.

8. An interactive-type user interface device as in claim 1, wherein:

the control means is capable of executing the interrupted interactive processing after interrupting interactive processing based on an application scenario group to execute interactive processing based on another application scenario group, after finishing the interactive processing based on this other application scenario group.

9. An interactive-type user interface device as in claim 8, wherein:

the control means provides an inquiry whether or not to execute the interrupted interactive processing and determines whether or not to execute the interrupted interactive processing on the basis of information inputted in response to the inquiry.

10. An interactive-type user interface device as in claim 1, wherein:

the inputted information is capable of being inputted as an information set made up of multiple pieces of information; and the control means can acquire the pieces of information in bloc in the interactive processing, when the inputted information is inputted as an information set.

11. An interactive-type user interface device as in claim 10, wherein:

the control means divides the inputted information into operation request information indicating an operation of an application and accompanying information relating to the operation request information and first executes processing based on the operation request information, when the inputted information is inputted as an information set.

12. An interactive-type user interface device as in claim 1, further comprising:

table storing means storing a classifying attribute table for classifying the inputted information, wherein the control means acquires a classifying attribute corresponding to the inputted information on the basis of the table stored in the table storing means, and executes the comparison processing using the classifying attribute.

13. An interactive-type user interface device as in claim 12, wherein:

the table storing means further stores a sub-classifying attribute table for differentiating pieces of operation request information belonging to the same classification; and the control means acquires, when necessary, a sub-classifying attribute in addition to the classifying attribute of the operation request information, and executes the comparison processing using the classifying attribute and the sub-classifying attribute.

14. An interactive-type user interface device as in claim 1, wherein:

at least one of the request information, the expected input information and the branch information constituting the dialogue information is capable of being described outside the respective application scenario group;

pointing information for pointing to the information described outside is described in the application scenario group; and the control means loads the information described outside on the basis of the pointing information, and makes an input request or performs branching based on the expected input information.

15. An interactive-type user interface device as in claim 14, wherein:

the request information, the expected input information or the branch information corresponding with the expected input information is capable of being described in the application scenario group in addition to the pointing information for pointing to information described outside; and the control means makes an input request or performs branching based on the expected input information on the basis of information read out using the pointing information and information described in the application scenario group.

16. An interactive-type user interface device as in claim 1, wherein:
the control means is capable of rewriting at least one of the request information, the expected input information and the branch information.

17. An interactive-type user interface device as in claim 1, further comprising:
common data storing means for storing the inputted information,
wherein the control means stores the inputted information in the common data storing means and is capable of acquiring the inputted information by referring to the common data storing means in interactive processing based on another application scenario group.

18. An interactive-type user interface device for use with respect to a plurality of applications, the device comprising:
control means for acquiring information needed by the applications through an interaction and sending the information to the applications, by executing interactive processing based on application scenario groups provided in one-to-one association with the applications, wherein:
  a root scenario is provided separately from the application scenario groups for realizing application branch processing which selects and starts an application corresponding to inputted information and loads the application scenario group associated with the started application;
  the control means is capable of executing interactive processing based on another of the application scenario groups part-way through the interactive processing based on one of the application scenario groups, by executing application branch processing based on the root scenario;
  each of the application scenario groups describes therein at least dialogue information made up of request information for making an input request requesting information needed by the respective application, expected input information expected to be inputted in response to the input request, and branch information corresponding to the expected input information;
  the control means carries out, as the interactive processing, input request processing based on the request information, comparison processing which compares inputted information with the expected input information, and branch processing based on results of this comparison;
  at least one of the request information, the expected input information and the branch information constituting the dialogue information is capable of being described outside the respective application scenario group;
  pointing information for pointing to the information described outside is described in the application scenario group; and
  the control means loads the information described outside on the basis of the pointing information, and makes an input request or performs branching based on the expected input information.

19. An interactive-type user interface device as in claim 18, wherein:
the inputted information is capable of being inputted as an information set made up of multiple pieces of information, and
the control means can acquire the pieces of information in bloc in the interactive processing, when the inputted information is inputted as an information set.

20. An interactive-type user interface device as in claim 18, further comprising:
table storing means storing a classifying attribute table for classifying the inputted information,
wherein the control means acquires a classifying attribute corresponding to the inputted information on the basis of the table stored in the table storing means, and executes the comparison processing using the classifying attribute.

21. An interactive-type user interface device as in claim 18, wherein:
the request information, the expected input information or the branch information corresponding with the expected input information is capable of being described in the application scenario group in addition to the pointing information for pointing to information described outside; and
the control means makes an input request or performs branching based on the expected input information on the basis of information read out using the pointing information and information described in the application scenario group.

22. An interactive-type user interface device as in claim 18, wherein:
the control means is capable of rewriting at least one of the request information, the expected input information and the branch information.

23. An interactive-type user interface device as in claim 18, further comprising:
common data storing means for storing the inputted information,
wherein the control means stores the inputted information in the common data storing means and is capable of acquiring the inputted information by referring to the common data storing means in interactive processing based on another application scenario group.

* * * * *